United States Patent
Hiraoka et al.

(10) Patent No.: US 8,583,184 B2
(45) Date of Patent: Nov. 12, 2013

(54) PORTABLE COMMUNICATION TERMINAL

(75) Inventors: Michiaki Hiraoka, Yokohama (JP); Kugo Morita, Yokohama (JP)

(73) Assignee: Kyocera Corporation, Kyoto (JP)

( * ) Notice: Subject to any disclaimer, the term of this patent is extended or adjusted under 35 U.S.C. 154(b) by 457 days.

(21) Appl. No.: 12/158,667

(22) PCT Filed: Dec. 19, 2006

(86) PCT No.: PCT/JP2006/325290
§ 371 (c)(1),
(2), (4) Date: Jun. 20, 2008

(87) PCT Pub. No.: WO2007/072827
PCT Pub. Date: Jun. 28, 2007

(65) Prior Publication Data
US 2010/0003916 A1 Jan. 7, 2010

(30) Foreign Application Priority Data

Dec. 21, 2005 (JP) .................................. 2005-367909

(51) Int. Cl.
*H04B 1/38* (2006.01)
(52) U.S. Cl.
USPC ..... 455/566; 455/567; 455/552.1; 455/550.1; 455/3.01; 455/3.06; 715/824; 715/823; 715/814; 715/804; 715/805
(58) Field of Classification Search
USPC ......... 455/3.01–3.06, 550.1, 552.1, 566, 567; 715/700, 701, 702, 708, 736, 741, 743, 715/768, 773, 805, 808, 814, 823, 824
See application file for complete search history.

(56) References Cited

U.S. PATENT DOCUMENTS

2004/0234937 A1 * 11/2004 Watanabe ...................... 434/323

FOREIGN PATENT DOCUMENTS

| JP | 02105929 A | 4/1990 |
|---|---|---|
| JP | 09-081447 | 3/1997 |
| JP | 10-097477 | 4/1998 |
| JP | 2000244616 A | 9/2000 |
| JP | 2002-353826 | 12/2002 |
| JP | 2003330328 A | 11/2003 |

(Continued)

OTHER PUBLICATIONS

Japanese language office action dated Apr. 10, 2012 and its English language translation issued in corresponding Japanese application 200788310.

(Continued)

*Primary Examiner* — Fayyaz Alam
(74) *Attorney, Agent, or Firm* — DLA Piper LLP (US)

(57) ABSTRACT

A portable communication terminal comprises wireless communication units 1, 2 for transmitting and receiving data by connecting to a communication line by wireless, broadcasting receiving units 3-9 for receiving digital broadcasting including a program image and data broadcasting, a communication service area determining unit 17 for determining whether or not to be in communication service area, a display unit 12 which has an image display region 23, a data broadcasting display region 24, and a soft key display region 25, a display control unit 11 for controlling display of the data broadcasting display region 24 and/or the soft key display region 25 based on at least the determination result by the communication service area determining unit 17, an access request detecting unit 15, and a wireless communication control unit 18 for controlling the wireless communication units 1,2 based on detection result by the access request detecting unit 15.

8 Claims, 12 Drawing Sheets

(56) References Cited

FOREIGN PATENT DOCUMENTS

| JP | 2004-072472 | 3/2004 |
| JP | 2004-247907 | 9/2004 |
| JP | 2004-303199 | 10/2004 |
| JP | 2005-026977 | 1/2005 |
| JP | 2005123933 A | 5/2005 |

OTHER PUBLICATIONS

Chinese language office action dated Apr. 20, 2011 and its English language translation for corresponding Chinese application 200680047859.1.

Chinese language office action dated May 24, 2012 and its English translation issued in corresponding Chinese application 200680047859.1.

Japanese language office action (interrogation) dated Nov. 8, 2011 and its English language translation for corresponding Japanese application 2005367909.

Chinese language office action dated Feb. 13, 2012 and its English language translation issued in corresponding Chinese application 200680047859.1.

Chinese language office action dated Aug. 2, 2012 and its English language translation issued in corresponding Chinese application 200680047859.1.

Japanese language office action dated Nov. 6, 2012 and its English language translation issued in corresponding Japanese application 2007088310 cites the foreign patent documents listed above.

* cited by examiner

PORTABLE COMMUNICATION TERMINAL

CROSS REFERENCE TO RELATED APPLICATION

This application claims priority to and the benefit of Japanese Patent Application No. 2005-367909 filed on Dec. 21, 2005, the entire content of which is incorporated herein by reference.

FIELD OF THE INVENTION

The present invention relates to a portable communication terminal for watching digital broadcasting including a program image and data broadcasting, and more specifically, to a portable communication terminal for watching a service for portable device of terrestrial digital broadcasting, namely, one segment broadcasting.

DESCRIPTION OF THE RELATED ART

Recently, various portable communication terminals for watching one segment broadcasting of terrestrial digital broadcasting have been experimentally made and announced. This kind of portable communication terminals set, from top to bottom, a pictogram region, an image display region, a data broadcasting display region and soft key display region on a display screen constructed by a liquid crystal display (LCD). On the pictogram region, there are displayed a battery mark indicating residual quantity of the battery, an antenna mark (which includes a character indicating out-of-service area) indicating electronic strength of received signal through communication line, current time, and so forth. On the image display region and the data broadcasting display region, there are displayed a program image and data broadcasting acquired by receiving terrestrial digital broadcasting (one segment broadcasting), respectively. On the soft key display region, there is displayed a soft key for indicating assignment of functions to operation keys provided in the terminal.

In here, in order to access an information site linked from the data broadcasting displayed on the data broadcasting display region, it is generally required that a user operates the terminal and selects desired contents or URI by moving focus or scrolling in the data broadcasting display region. If a communication line is connectable at that time, the terminal displays selected contents by converting it to BML contents or accessing home page of portable telephone site through the communication line. If the connection line is unconnectable, it notifies the user that the communication line is not connectable by displaying such message on the screen.

In other words, as shown in a flow chart of FIG. 14, when a user watches the terrestrial digital broadcasting (step S1401) and selects a link in the data broadcasting display region (step S1402), it is determined whether a communication line is connectable (step S1403). In case of being connectable (Yes), selected contents are displayed through the communication line (step S1404). In case of being unconnectable (No), it is reported to the user that the communication line is not connectable by displaying the message on a screen (step S1405), and it proceeds to the step 1402.

Moreover, in order to confirm whether the communication line is connectable before operating keys, a user has to refer to the antenna mark displayed on the pictogram region of the top of display screen.

It is known that a terminal displays a predetermined position of the display screen in a color corresponding to electronic strength of a received signal in order to allow a user to confirm electronic strength of the received signal through a communication line easily (see Japanese Patent Application Laid-open No. 2002-353826). Also, in an on-vehicle terminal connected to network with wireless LAN, it is known to check whether or not accessible to a link destination corresponding to each link information, communication speed, and the like through real communication operation by background process with performing display process of a menu screen, and display the result on the menu screen in order to improve the connection operability to link destination corresponding to link information included in the menu screen (see Japanese Patent Application Laid-open No. 2004-303199). However, these documents do not disclose anything for mutual communication in terrestrial digital broadcasting.

DISCLOSURE OF THE INVENTION

Problems to be Solved by the Invention

However, with the conventional portable communication terminal that performs the access process shown in FIG. 14, in case a communication line is not connectable, a user can know the fact after he tries to connect to the communication line by operating the terminal. In that case, the user may try to connect to the communication line by doing the same terminal operation after a little, so that the user will repeat the same operation until the communication line is connected. Accordingly, although there is no particular problem when the circumstance difficult to connect to the communication line continues temporarily for a while, operation is very cumbersome when it continues for a long time.

For preventing such cumbersomeness, the user can operate the terminal with confirming whether the communication line is connectable or not from the antenna mark displayed on the pictogram region. However, it is difficult to see the antenna mark as the pictogram region is apart from the data broadcasting display region on the screen and the image display region exists between of them. There are many times that a user cannot catch change of the antenna mark, especially, when watching broadcasting contents such as moving pictures.

It also seems that there are many users who are not aware that access from the data broadcasting display screen is performed through the communication line and the antenna mark is used as the indicator therefor. In other words, although a portable communication terminal which has the function for receiving terrestrial digital broadcasting provides a user with a new type of service in which broadcasting and communication are merged, the user who uses it routinely is not conscious where the broadcasting ends and where the communication starts and uses it as a total service of the portable communication terminal. Thus, when a user performs communication with watching broadcasting, it cannot be expected that the user confirm a state of reception from the antenna mark on the pictogram region at the top of the screen.

In the view of the above problem, an object of the present invention is to provide a portable communication terminal that allows a user to recognize easily and surely whether it is possible to communicate through a communication line while watching digital broadcasting.

Means for Solving the Problem

To achieve the above object the portable communication terminal of claim 1 comprises:

a wireless communication means for transmitting and receiving data by connecting to a communication line by wireless;

a broadcasting receiving means for receiving digital broadcasting including a program image and data broadcasting;

a communication service area determining means for determining whether the wireless communication means is in communication service area;

a display means which has an image display region on which the program image received by the broadcasting receiving means is displayed, a data broadcasting display region on which the data broadcasting can be displayed, and a soft key display region on which a soft key is displayed;

a display control means for controlling display of the data broadcasting display region and/or the soft key display region based on at least determination result by the communication service area determining means;

an access request detecting means for detecting access request to the communication line; and a wireless communication control means for controlling the wireless communication means based on detection result by the access request detecting means.

The invention recited in claim 2 is characterized in that, in the portable communication terminal of claim 1, the display control means controls display of a contour of the data broadcasting display region and/or the soft key display region.

The invention recited in claim 3 is characterized in that, in the portable communication terminal of claim 1, the display control means controls display luminance to be lower when the communication service area determining means determines not to be in communication service area than that when the communication service area determining means determines to be in communication service area.

The invention recited in claim 4 is characterized in that, in the portable communication terminal of claim 1, the display control means controls display to be performed in color when the communication service area determining means determines to be in communication service area and to be performed in monochrome when the communication service area determining means determines not to be in communication service area.

The invention recited in claim 5 is characterized in that, in the portable communication terminal of claim 1, the wireless communication control means checks determination result by the communication service area determining means, selectively reserves access request when the access request detecting means detects the access request in a condition that the wireless communication means is not in communication service area, and selectively executes the reserved access request through the wireless communication means in a condition the wireless communication means becomes to be in communication service area.

The invention recited in claim 6 is characterized in that, in the portable communication terminal of claim 5, the wireless communication control means allows the display control means to display a pop-up screen indicating whether to be able to reserve the access request on the data broadcasting display region, to display a soft key for selecting whether to be able to reserve the access request on the soft key display region, and to selectively reserve the access request based on operation of the soft key when the access request detecting means detects the access request in a condition that the wireless communication means is not in communication service area.

The invention recited in claim 7 is characterized in that, in the portable communication terminal of claim 5, the wireless communication control means allows the display control means to display a pop-up screen indicating whether to be able to execute the reservation on the data broadcasting display region, to display a soft key for selecting execution of the reservation on the soft key display region, and to selectively execute the reserved access request based on operation of the soft key when there is the reserved access request in a condition that the wireless communication means becomes to be in communication service area.

The invention recited in claim 8 is characterized in that, in the portable communication terminal of claim 1, the display control means displays a pop-up screen indicating that the communication line is not connectable instead of displaying the data broadcasting on the data broadcasting display region when the communication service area determining means determines not to be in communication service area.

Effect of the Invention

According to the present invention, display of the digital broadcasting display region and/or soft key display region is controlled based on whether the wireless communication means is in a communication service area while watching digital broadcasting so that it allows a user to recognize easily and surely from the display whether it is possible to communicate through a communication line.

Figure 1:
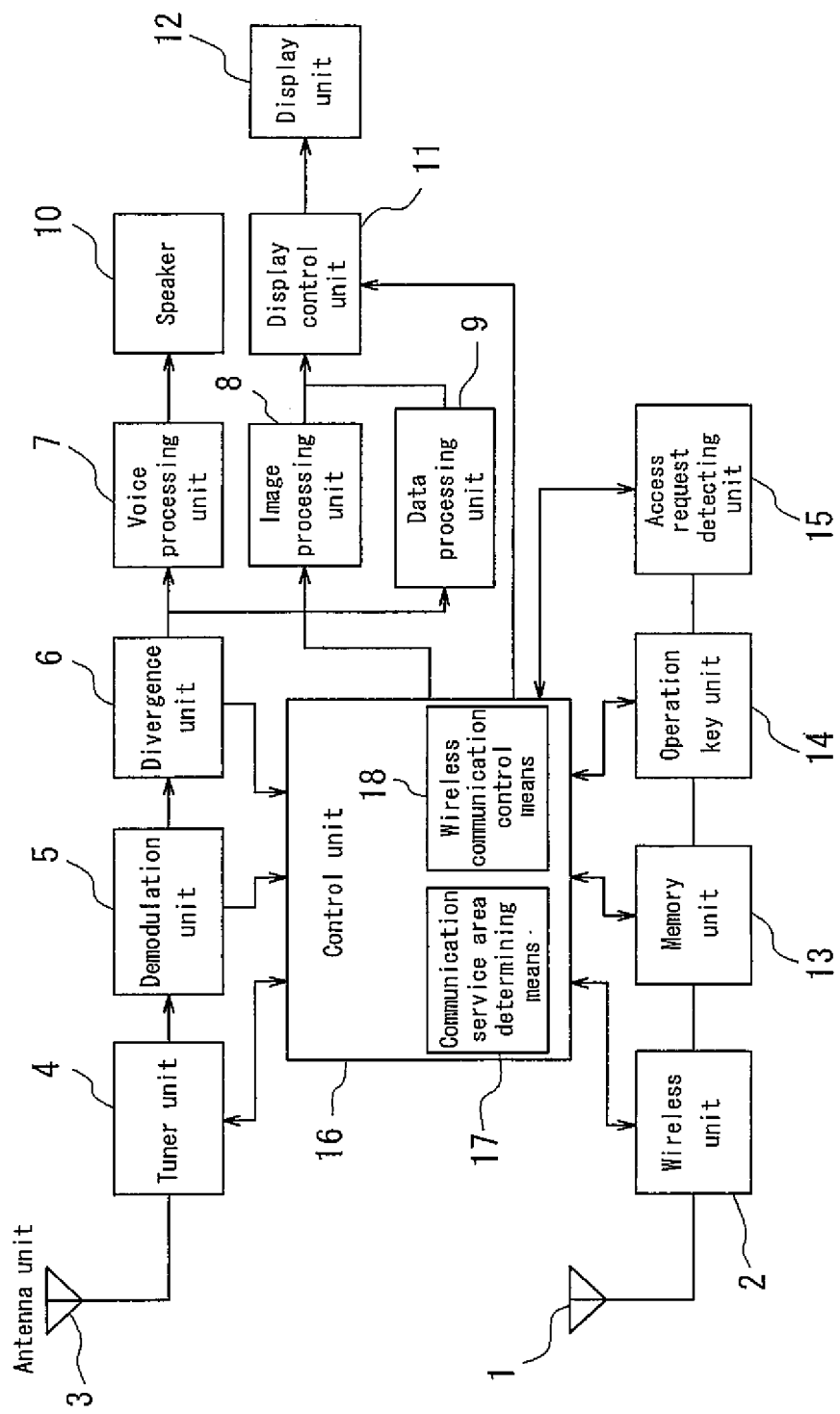
FIG. 1 is a block diagram illustrating a circuit configuration of a main part of a portable communication terminal according to a first embodiment of the present invention.

REFERENCE SYMBOLS 1 antenna unit
2 wireless unit
3 antenna unit
4 tuner unit
5 demodulation unit
6 divergence unit
7 voice processing unit
8 image processing unit
9 data processing unit
10 speaker
11 display control unit
12 display unit
13 memory unit
14 operation key unit
15 access request detecting unit
16 control unit
17 communication service area determining means
18 wireless communication control means
19 monochrome judging means
21 display picture
22 pictogram region
23 image display region
24 data broadcasting display region
24a contour
25 soft key display region
31 battery mark
32 antenna mark
33 current time

BEST MODE FOR CARRYING OUT THE INVENTION

Preferred embodiments of the present invention will now be described with reference to the accompanying drawings.

(First Embodiment)

FIG. 1 is a block diagram illustrating a circuit configuration of a main part of a portable communication terminal according to the first embodiment of the present invention.

The portable communication terminal comprises an antenna unit 1 for a communication line and a wireless unit 2 which compose a wireless communication means, as well as an antenna unit 3 for broadcasting, a tuner unit 4, a demodulation unit 5 for extracting transport stream (TS) packets, a divergence unit 6 for separating the extracted TS packets, and a voice processing unit 7, an image processing unit 8 and a data processing unit 9 for processing the TS packets separated in the divergence unit 6 which compose a broadcasting receiving means for receiving terrestrial digital broadcasting. A speaker 10 is connected to the voice processing unit 7, and a display unit 12 which composes a display means is connected to the image processing unit 8 and the data processing unit 9 through a display control unit 11 which composes a display control means.

It further comprises a memory unit 13 for storing various kinds of data such as output control data and the like, an operation key unit 14 for operating the portable communication terminal, an access request detecting unit 15 which composes an access request detecting means for detecting a connection request (access request) to a communication line according to user's key operation, and a control unit 16 for controlling the portable communication terminal entirely.

In this embodiment, the control unit 16 has a communication service area determining means 17 for determining whether the wireless communication means is in communication service area, in other words, whether the portable communication terminal is in communication service area based on electronic strength of a received signal by the wireless unit 2, and a wireless communication control means 18 for controlling data transmission and reception in the wireless unit 2 based on the detection result of access request by the access request detecting unit 15.

Figure 2:
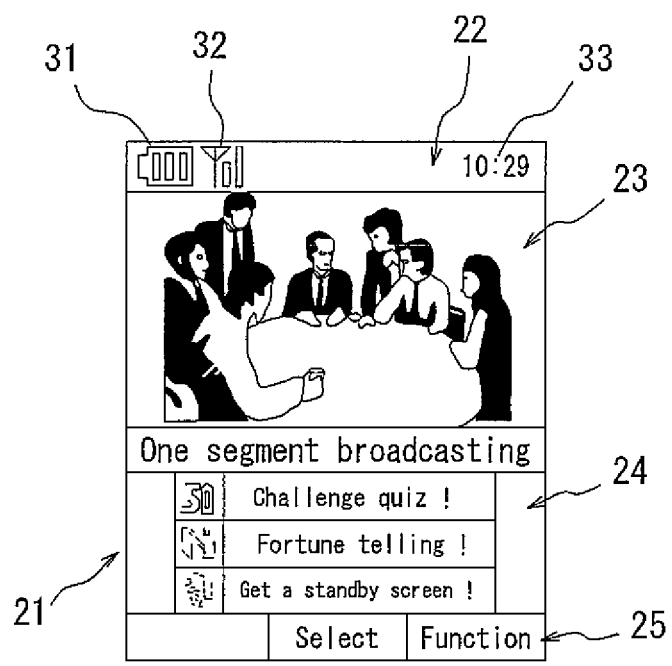
FIG. 2 shows a screen configuration of the display unit shown in the FIG. 1 while terrestrial digital broadcasting is watched.

The display unit 12 has a self-emission display device formed by, for example, organic EL, and sets a pictogram region 22, an image display region 23, a data broadcasting display region 24, a soft key display region 25 on the display picture 21 from the top to the bottom, as shown in FIG. 2, in state of watching terrestrial digital broadcasting (one segment broadcasting). And, it displays a battery mark 31 indicating residual quantity of the battery, an antenna mark 32 (which includes a character indicating 'out-of-service area') indicating electronic strength of a received signal through the communication line, current time 33 and the like on the pictogram region 22, displays a program image from the image processing unit 8 on the image display region 23, displays data broadcasting from the data processing unit 9 on the data broadcasting display region 24, and displays a soft key for indicating assignments of function to predetermined keys provided to the operation key unit 14 on the soft key display region 25.

In this embodiment, while a user watches terrestrial digital broadcasting, the display control unit 11 controls display luminance of the data broadcasting display region 24 based on determination result by the communication service area determining means 17, and always notifies the user whether access from the data broadcasting screen is possible or not at the present time.

Figure 3:
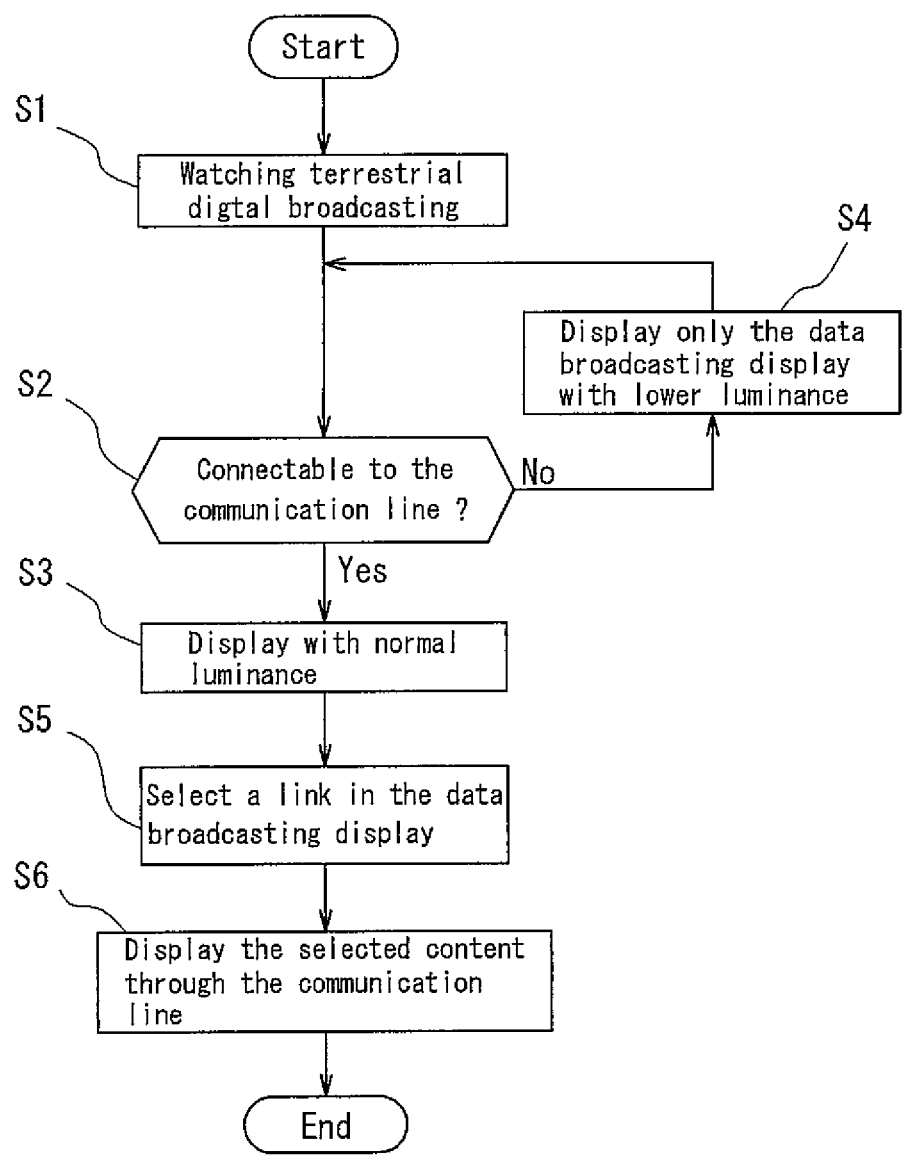
FIG. 3 is a flow chart illustrating an operation of a main part of the portable communication terminal according to the first embodiment.

Below, an operation of main part of this embodiment will be described by referring to a flow chart shown in FIG. 3.

Figure 4:
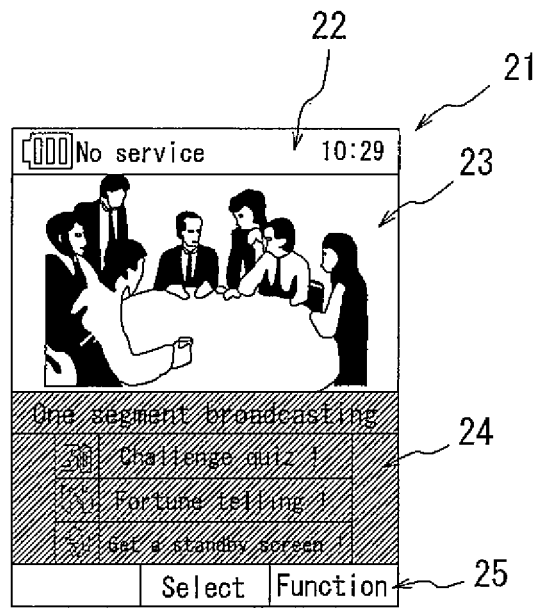
FIG. 4 exemplifies display on the data broadcasting display region when a communication line is not connectable in the first embodiment.

First, when a television application for terrestrial digital broadcasting is started and it becomes the state of watching terrestrial digital broadcasting (step S1), it is determined whether a communication line is connectable with determination result by the communication service area determining means 17 (step S2). When it is connectable (Yes), the display control unit 11 displays the entire display picture 21 with normal luminance as shown in FIG. 2 (step S3). When it is not connectable (No), the display control unit 11 displays only data broadcasting picture on the data broadcasting display region 24 with lower luminance than the normal luminance as shown in FIG. 4 until it is connectable (step S4). On the other hand, information for gray scale is maintained to transmit intention of a broadcasting provider to a user as accurate as possible.

When a link is selected (step S5) in the condition that the entire display picture 21 is displayed with normal luminance in the step S3, the selected content is displayed through communication line (step S6).

In this embodiment, while terrestrial broadcasting is watched, the display picture 21 is entirely displayed with normal luminance if a communication line is connectable, and only data broadcasting picture on the data broadcasting display region 24 is displayed with lower luminance than the normal luminance if not connectable. Therefore, a user can recognize at a look whether a link is accessible or not from display luminance easily and surely with seeing the data broadcasting picture without key operation. Especially, in case that a user moves from out-of-service area into communication service area, display luminance of the data broadcasting picture is raised from low luminance to normal luminance. Therefore, it is possible to make user recognize the change immediately and to promote access operation to the link.

Also, since the data broadcasting is displayed with low luminance even if a communication line is not connectable, a user can see the content of the data broadcasting. Therefore, it is possible to inform the user whether a link is accessible or not without damaging intention of broadcasting as a whole. Moreover, as the display luminance of data broadcasting picture is set to low luminance in the condition that the communication line is not connectable, it is possible to reduce power consumption of the terminal as a whole and to extend the battery life.

Figure 5:
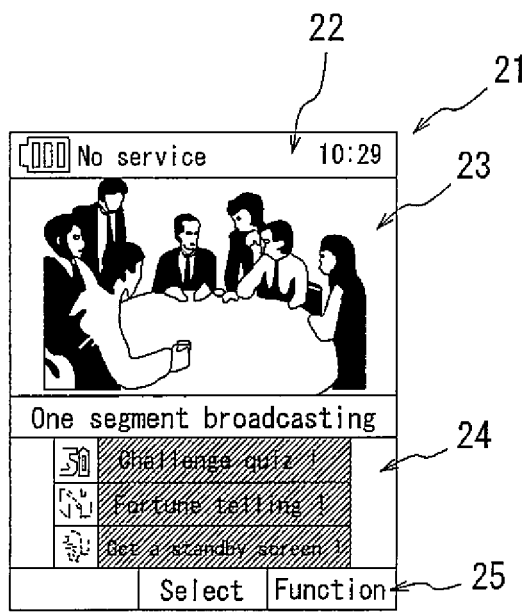
FIG. 5 similarly exemplifies another display.

In this embodiment, the entire data broadcasting picture on the data broadcasting display region 24 is displayed with lower luminance than normal luminance as shown in FIG. 4 when a communication line is not connectable. However, only selectable parts (URI mark or reply button and the like) with a cursor and the like, in other words, only parts which may be triggers of communication occurrence may be displayed with low luminance as shown in FIG. 5. In this case, since it is possible to inform a user more visually that the described link on the data broadcasting picture is not available at the present time, beginners or old people who are not familiar with a portable communication terminal can recognize the status of communication line easily and surely.

(Second Embodiment)

Figure 6:
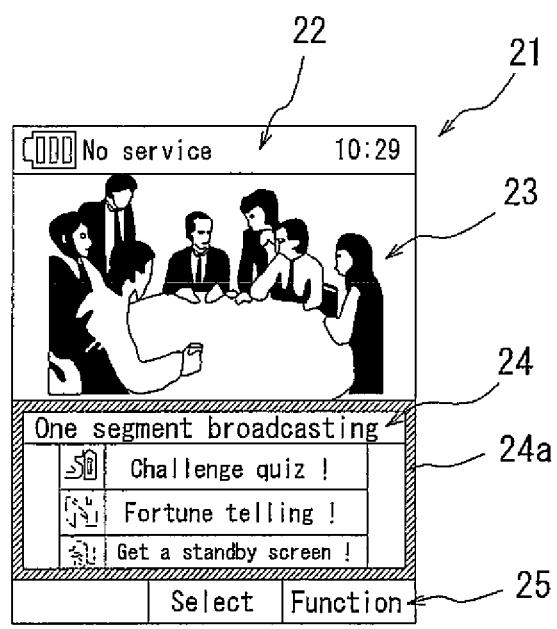
FIG. 6 exemplifies display on a screen by a portable communication terminal according to a second embodiment of the present invention.

FIG. 6 exemplifies display on a screen by a portable communication terminal according to the second embodiment of the present invention.

In this embodiment only a contour (frame) 24a of the data broadcasting display region 24 is displayed with low luminance in case a communication line is not connectable while terrestrial digital broadcasting is watched, in comparison with the first embodiment.

Therefore, according to this embodiment a user can recognize at a look whether a link is accessible or not from display status of the contour 24a of the data broadcasting display region 24 easily and surely. In addition, as the main part of the data broadcasting is always displayed with normal luminance even if the communication line is not connectable, the user can watch data broadcasting more easily.

(Third Embodiment)

Figure 7:
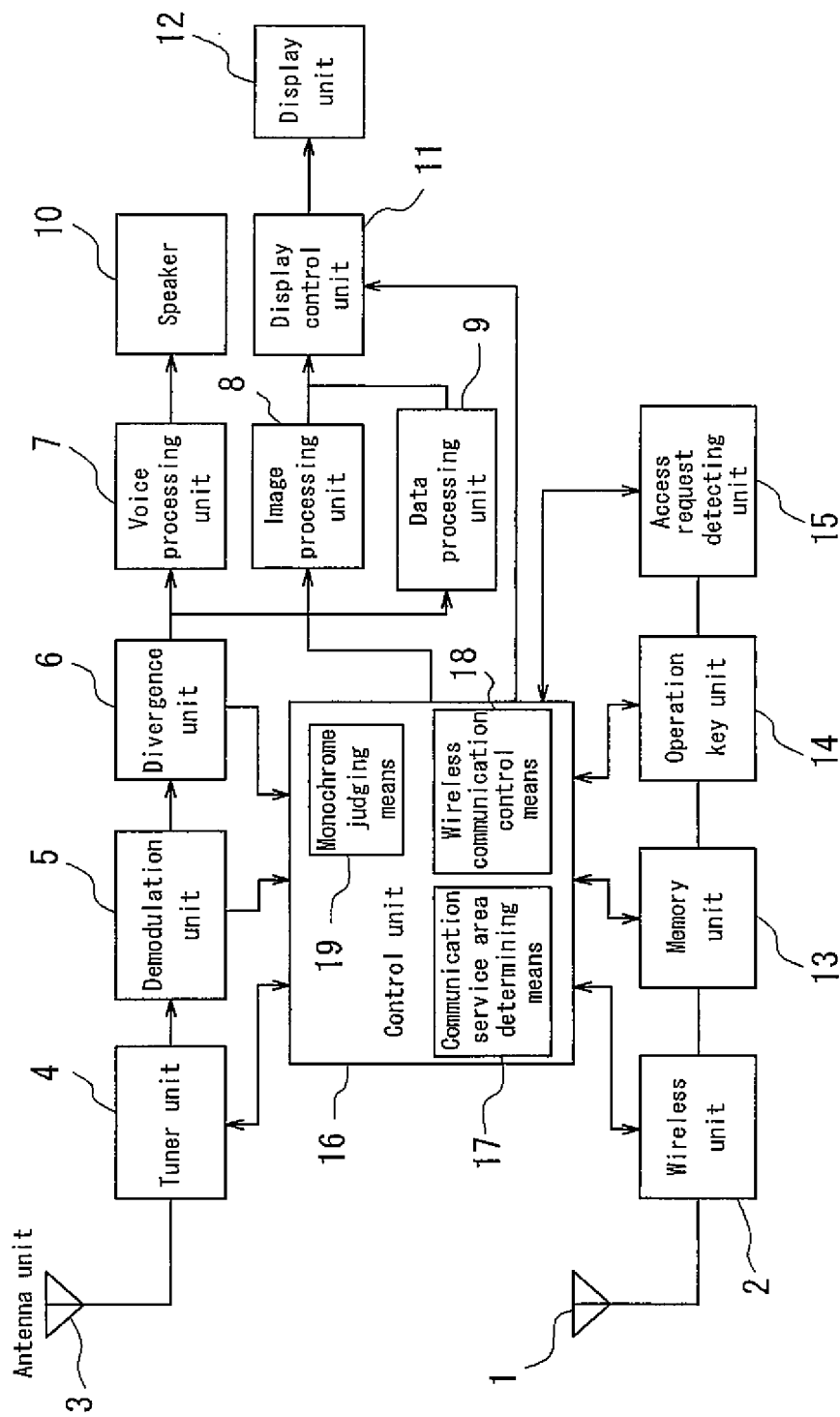
FIG. 7 is a block diagram illustrating a circuit configuration of a main part of a portable communication terminal according to a third embodiment of the present invention.

FIG. 7 is a block diagram illustrating a circuit configuration of a main part of a portable communication terminal according to the third embodiment of the present invention.

In this embodiment, when the communication service area determining means 17 determines to be in communication service area, a data broadcasting picture on the data broadcasting display region 24 is displayed in color When the communication service area determining means 17 determines not to be in communication service area, the data broadcasting picture on the data broadcasting display region 24 is displayed in monochrome, in comparison with the first embodiment.

For this, in this embodiment, the control unit 16 has a monochrome judging means 19 for judging color composition of data broadcasting, and checks whether or not data broadcasting is a color image while terrestrial digital broadcasting is watched. In addition, color information at the time that a monochrome image of data broadcasting is colored and displayed is stored in the memory unit 13.

In this way, in case the terrestrial digital broadcasting is judged as a color image by the monochrome judging means 19 while terrestrial digital broadcasting is watched, the data broadcasting is displayed as a color picture, as it is, on data broadcasting display region 24 through the display control unit 11 if a communication line is connectable based on the determination result by the communication service area determining means 17. If the communication line is not connectable, the data broadcasting is converted to a monochrome image by the display control unit 11 and displayed on the data broadcasting display region 24.

Moreover in case data broadcasting is judged as a monochrome image by the monochrome judging means 19, the data broadcasting is converted to a color image based on the color information previously stored in the memory unit 13 by the display control unit 11 and displayed on the data broadcasting display region 24 if the communication line is connectable based on the determination result by the communication service area determining means 17. If the communication line is not connectable, the data broadcasting is displayed as a monochrome image, as it is, on the data broadcasting display region 24 through the display control unit 11.

It is noted that monochrome display of data broadcasting may be performed to the entire data broadcasting picture on the data broadcasting display region 24 as described in the first embodiment or may be performed to only selectable parts with a cursor and the like which are triggers of communication occurrence.

In here, the monochrome judging means 19 judges an image by following process as known. First, R (red), G (green), B (blue) which compose a data broadcasting image (picture) are converted to color space of hue, saturation, and value according to following equations.

$$H = \tan^{-1}\{(G-B)/(2R-G-B)\}$$

$$S = \{(B-R)2+(R-G)2+(G-B)2\}/3$$

$$V = (R+G+B)$$

Next it is judged whether saturations of colors that compose a picture are below a monochrome judgment threshold. If colors more than a predetermined ratio (e.g., 90%) on a basis of area ratio are below the monochrome judgment threshold, data broadcasting is judged as a monochrome image.

In case of converting data broadcasting judged as a monochrome image to a color image and displaying it, first, the saturation is multiplied by α as known (for example if the monochrome judgment threshold is assumed to 0.1 for the maximum value of saturation equal to 1.5, the α is set to 1.5/0.1). On this condition, monochrome judgment is performed. When the picture is judged to be monochrome, the saturation is further multiplied by α. It is repeated until the picture is judged not to be monochrome. Then, it is converted to a color image of RBG by HSV-RGB transform according to following equations and displayed. Note that when the saturation is equal to '0', it is colored based on color table according to the value (V).

$$R = V/3 + 2\ S\cos(H/6)$$

$$G = V/3 - S\cos(H/6) + S\sin(H/2)$$

$$B = V/3 - S\cos(H/6) - S\sin(H/2)$$

Other constructions and operations are not described herein because they are the same as those of first embodiment.

In this embodiment, while terrestrial digital broadcasting is watched, a data broadcasting picture is displayed in color if a communication line is connectable, and the data broadcasting picture is displayed in monochrome if it is not connectable. Accordingly, a user can recognize at a look whether a link is accessible or not from color of the data broadcasting picture easily and surely without a key operation.

Moreover, in this embodiment, as a data broadcasting picture is selectively displayed in color or monochrome, the display unit 12 is preferably constructed by self-emission display device which consists of four colors in which W (white) is added to RGB. In other words, in order to perform monochrome display with the self-emission device of three colors, RGB, it is required to control luminance of each element with turning all RGB elements on, as before. Accordingly, saving power is not substantially expected. As compared with this, in case of using a self-emission display device of four colors, RGBW, it is only required to turn one element of color W with turning elements of three colors RGB off. Therefore, it is possible to reduce power consumption substantially.

(Fourth Embodiment)

Figure 8:
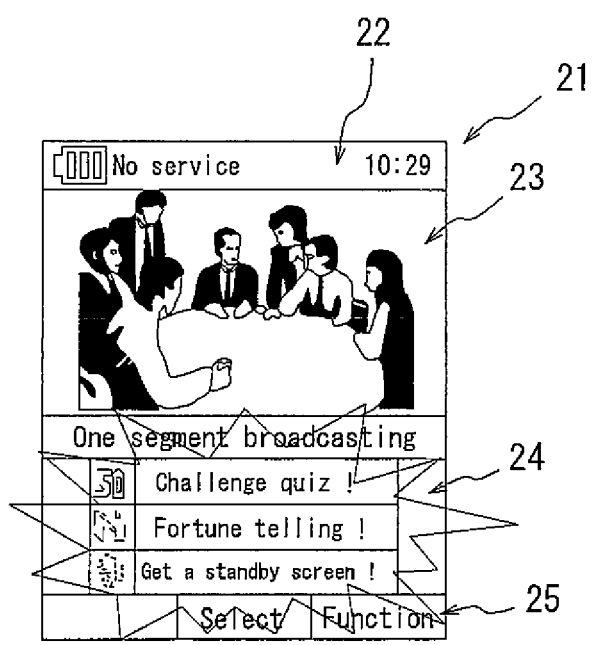
FIG. 8 exemplifies display on a screen by a portable communication terminal according to a fourth embodiment of the present invention.

FIG. 8 exemplifies display on a screen by a portable communication terminal according to the fourth embodiment of the present invention.

In this embodiment, when it is intermittently determined to be out of service area by the communication service area determining means 17, in other words, when connection to the communication line is unstable, the display control unit 11 turns the data broadcasting display region 24 on and off regularly and slowly, in the configuration shown in FIG. 1. FIG. 8 shows flickering status of the data broadcasting display region 24 diagrammatically.

In here, in order to detect the unstable status of communication line, for example, the communication service area determining means 17 counts determination number of transition from communication service area to out-of-service area in a predetermined time with an inner timer of the control unit 16. The communication line is detected to be unstable when the counted number is above a predetermined number.

When connection to a communication line is unstable based on determination result by the communication service area determining means 17, turning the data broadcasting display region 24 on and off regularly and slowly allows a user to recognize easily and surely that connection to the communication line is unstable. Moreover, it can reduce unpleasant feeling of the user in comparison with a case that display is irregularly controlled in accordance with whether a communication line is connectable or not in unstable connection status.

(Fifth Embodiment)

Figure 9:
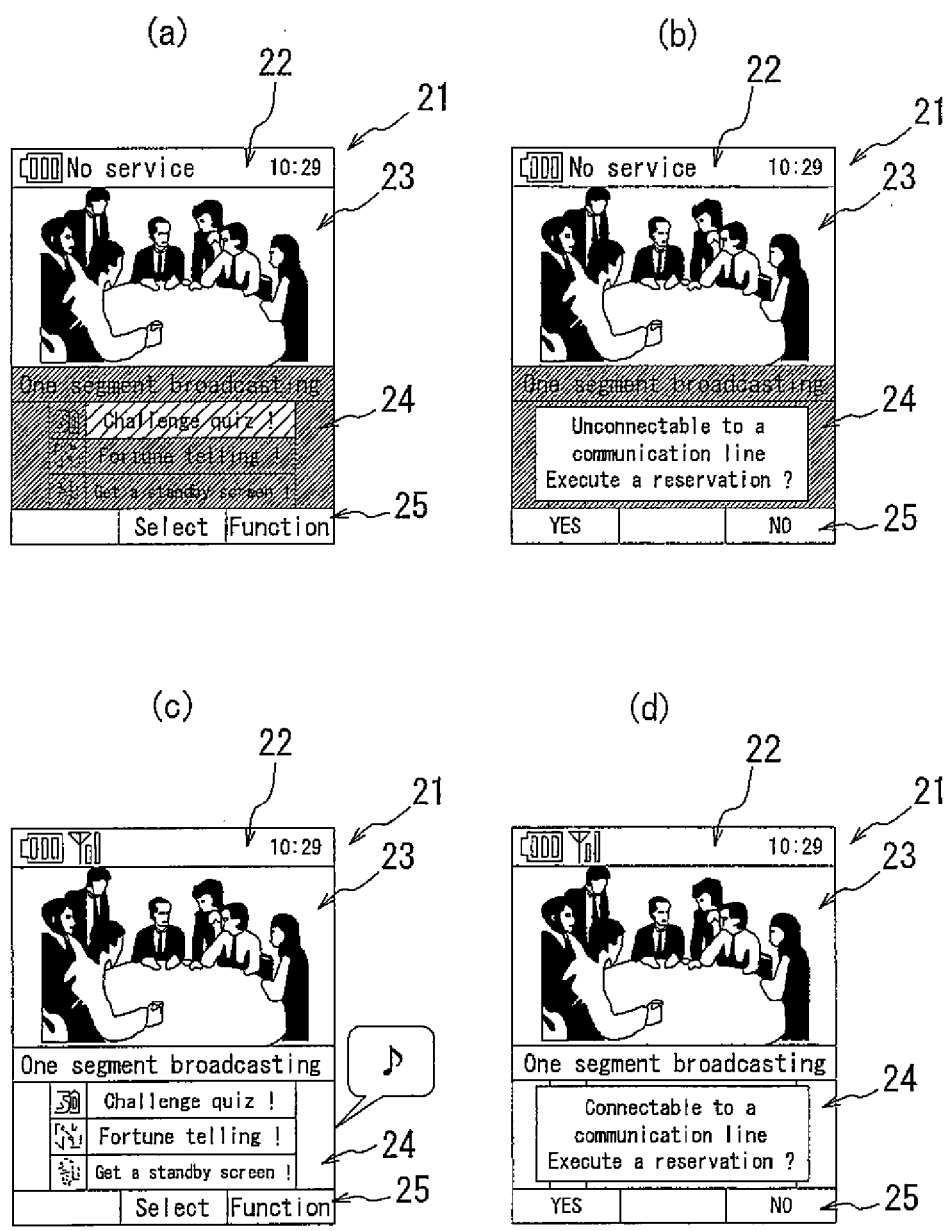
FIG. 9 exemplifies display on a screen by a portable communication terminal according to a fifth embodiment of the present invention.

FIGS. 9(*a*)~(*d*) exemplify display on a screen by a portable communication terminal according to the fifth embodiment of the present invention.

In this embodiment, the wireless communication control means 18 checks determination result of the communication service area determining means 17 in the foregoing embodiment. When an access request is detected out of communication service area by the access request detection unit 15, the access request is selectively reserved and the reserved access request is selectively executed after being in communication service area.

For this, in this embodiment, when an access request is detected in the condition that it is out of communication service area and the data broadcasting display region 24 is displayed, for example, with low luminance as described in the first embodiment, as shown in FIG. 9(*a*), the display control unit 11 displays a pop-up screen indicating that a communication line is not connectable and whether or not to reserve the access request by a key operation on the data broadcasting display region 24 as shown in FIG. 9(*b*), in the configuration shown in FIG. 1. The display control unit 11 also displays soft keys, 'YES' and 'NO', for selecting whether or not to reserve on the soft key display region 25 and promotes a predetermined key operation corresponding to the soft keys to a user, and makes the user select whether or not to reserve the access request.

In here, when reservation of access request is selected, the access request is stored in the memory unit 13. Then, when luminance of the data broadcasting display region 24 returns to the normal luminance as shown in FIG. 9(*c*) as the communication line becomes to be connectable, it is reported that the communication line is connectable in voice through a speaker 10 or by flash display on the entire screen by the display control unit 11 at the time. Then, the display control unit 11 displays a pop-up screen indicating that the communication line is connectable and whether or not to execute the reservation on the data broadcasting display region 24 as shown in FIG. 9(*d*). It also displays soft keys, 'YES' and 'NO' for selecting whether or not to execute the reservation on the soft key display region 25, promotes predetermined key operation corresponding to the soft keys to a user, and makes the user select whether or not to execute the reservation.

Figure 10:
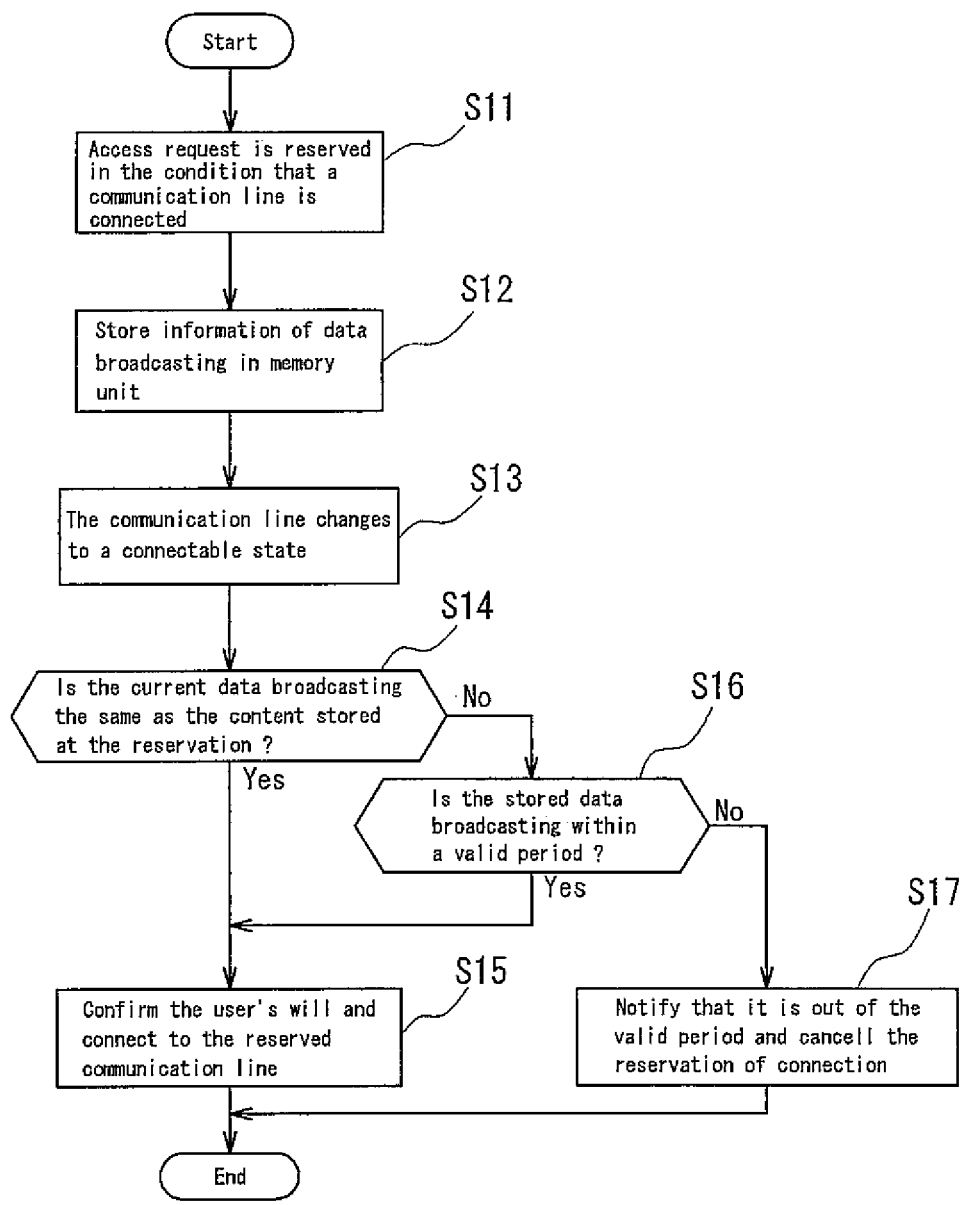
FIG. 10 is a flow chart illustrating an operation of a main part of the portable communication terminal according to the fifth embodiment.

FIG. 10 is a flow chart illustrating an operation in case access request is reserved according to the present invention.

First, in the step S11, if the access request is reserved in the condition that a communication line is disconnected, information of data broadcasting to which access is requested is stored in the memory unit 13 (step S12). Then, when the communication line is connectable with a change of circumstance (step S13), content of current data broadcasting is compared with content of reserved data broadcasting previously stored in the memory 13 (step S14). If contents are same each other, the reserved communication line is connected after user's intention is confirmed (step S15).

On the other hands, in the step S14, if the content of current data broadcasting differs from the content of reserved data broadcasting, the reservation has priority and it is determined whether the content of data broadcasting stored is available at the present time (step S16). If it is in available period, the operation proceeds to step S15 in which the reserved communication line is connected after user's intention is confirmed. If it is out available period, a user is informed that the reserved content is not available at the present time by pop-up and the like on the screen, and the reservation is canceled (step S17).

As described above, in the present invention, access request can be reserved out of communication service area, and the reserved access request can be executed when it becomes to be in communication service area. Therefore, a user needs not to wait to enter communication service area and can perform access process with recognizing that he is out of communication service area. Thus, it is possible to improve convenience of use.

(Sixth Embodiment)

Figure 11:
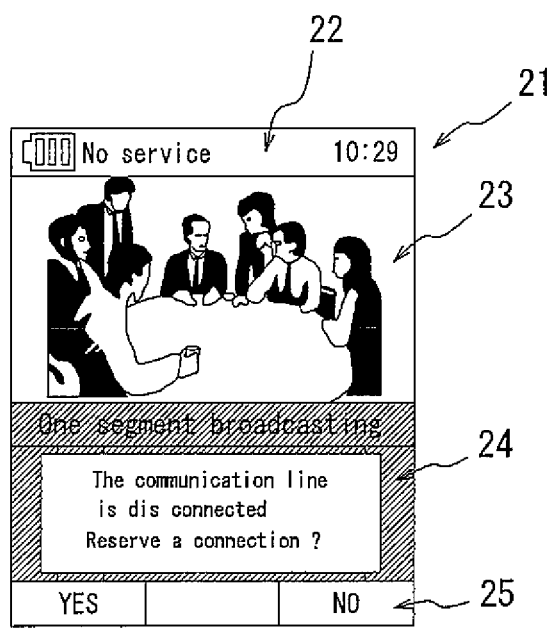
FIG. 11 exemplifies display on a screen by a portable communication terminal according to a sixth embodiment of the present invention.

FIG. 11 exemplifies display on the screen by the portable communication terminal according to the sixth embodiment.

In this embodiment, when the communication service area determining means 17 determines not to be in communication service area while a user operates the data broadcasting screen in the connected condition of the communication line, the display control unit 11 displays a pop-up screen indicating that the communication line is disconnected and whether or not to reserve the access request at the disconnected time on the data broadcasting display region 24. It also displays soft keys, 'YES' and 'NO' for selecting whether or not to reserve the access request on the soft key display region 25, promotes a predetermined key operation corresponding to the soft key to a user, and makes the user select whether or not to reserve access request.

In here, when reservation of access request is selected, as done in the fifth embodiment, the access request is stored in the memory unit 13. Then, when a communication line becomes to be connectable, it is reported that the communication line is connectable in voice or by flash display on the entire screen at that time. Thereafter, the display control unit 11 displays a pop-up screen indicating that the communication line is connectable and whether or not to execute the reservation on the data broadcasting display region 24 as shown in FIG. 9(d). It also displays soft keys, 'YES' and 'NO' for selecting whether or not to execute the reservation on the soft key display region 25, promotes a predetermined key operation corresponding to the soft keys to a user, and makes the user select whether or not to execute the reservation.

Accordingly, in this embodiment, the operation in case access request is reserved is the same as the flow chart shown in FIG. 10.

As described above, in this embodiment, when it becomes to be out of communication service area while a user operates a data broadcasting screen by connecting to the communication line, the user can reserve access request on operation and execute the reserved access request when it becomes to be in communication service area. Therefore, it is possible to simplify a key operation when the portable communication terminal returns to the communication service area and to improve convenience of use.

(Seventh Embodiment)

Figure 12:
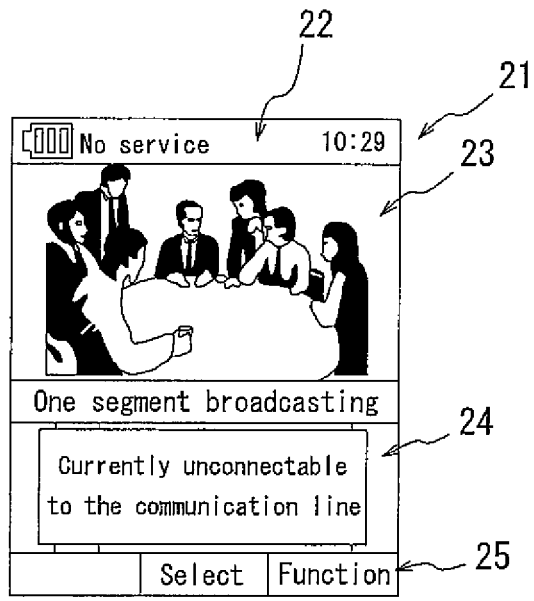
FIG. 12 exemplifies display on a screen by a portable communication terminal according to a seventh embodiment.

FIG. 12 exemplifies display on a screen by a portable communication terminal according to the seventh embodiment.

In this embodiment when the communication service area determining means 17 determines not to be in communication service area, the display control unit 11 displays a pop-up screen indicating that a communication line is not connectable on the data broadcasting display region 24 instead of displaying data broadcasting, in the configuration shown in FIG. 1.

When it is not in communication service area, displaying a pop-up screen indicating that a communication line is not connectable instead of displaying data broadcasting on the data broadcasting display region 24 allows a user to recognize at a look that the link is not accessible easily and surely. Moreover, as data broadcasting is not displayed, it can prevent a user from operating keys unnecessarily.

It is to be understood that the present invention is not limited to the disclosed embodiments and may be embodied in various modifications. For example, in the second embodiment shown in FIG. 6, although luminance of a contour 24a of the data broadcasting display region 24 is controlled to be low when the communication line is not connectable, display color of the contour may be controlled to be different. For example, the contour 24a may be displayed in Green when the communication line is connectable and it may be displayed in Red when the communication line is not connectable, or such like.

In the above-described embodiment, although display on the data broadcasting display region 24 is controlled based on determination result by the communication service area determining means 17, luminance, display color (monochrome or color), contour and the like of the soft key display region 25 may be controlled instead of those of the data broadcasting display region 24. Alternatively, both display on data broadcasting display region 24 and soft key display region 25 may be controlled simultaneously.

Moreover, it is possible to provide the portable communication terminal with display control function of the data broadcasting display region 24 and/or the soft key display region 25 based on the determination result of the communication service area determining means 17 described above, and allow a user to select a desired display control function by a key operation.

Figure 13:
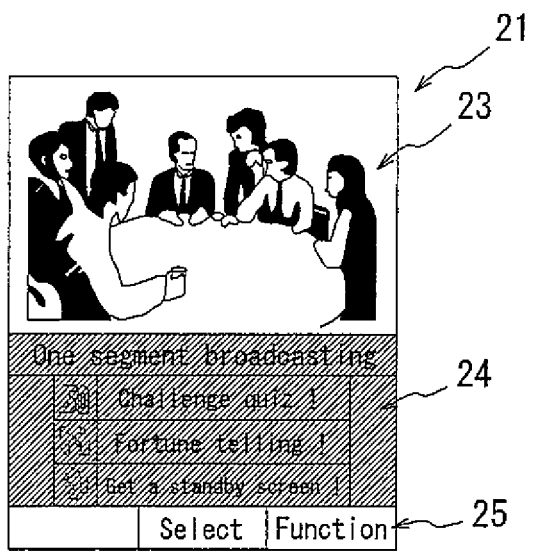
FIG. 13 shows a varied example of display on a screen according to the present invention.
Figure 14:
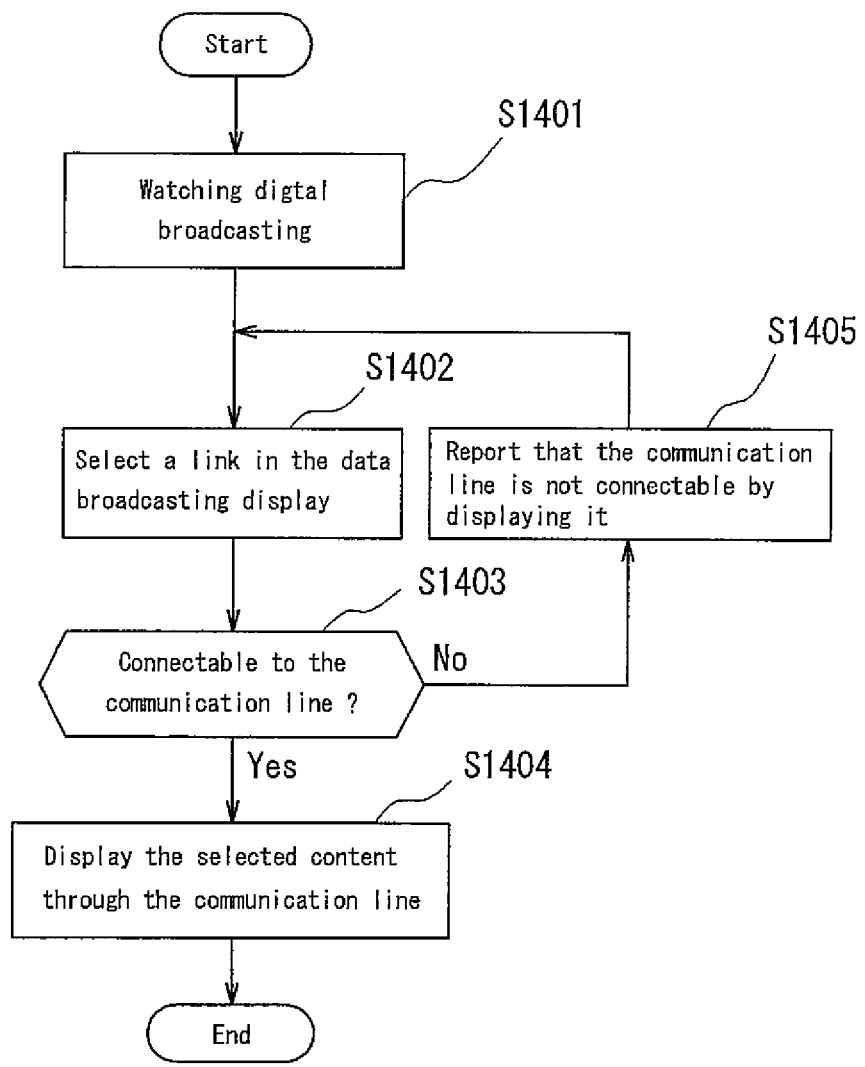
FIG. 14 is a flow chart illustrating an access process by a conventional portable communication terminal.

Furthermore, in the present invention, as a user can easily recognize whether the communication line is connectable from display of the data broadcasting display region 24 and/or the soft key display region 25 while watching digital broadcasting, the antenna mark 32 on the pictogram region 22 may not be necessary. Therefore, for example, it is possible not to display the pictogram region 22 while digital broadcasting is watched, and to display an image by inserting the region to the image display region 23 as shown in FIG. 13. In this case, the image display region 23 is enlarged, so that it is possible to display an image comfortably to see. Of course, the user may intentionally select whether or not to display the pictogram region 22 with a key operation.

Furthermore, the present invention can be applicable to a portable communication terminal having a display screen that is wider than it is tall as well as display screen that is taller than it is wide.

Further, it is possible to use a liquid crystal display device as well as self-emission display device such as organic EL as the display means. But, in case of controlling luminance of the data broadcasting display region 24 and/or the soft key display region 25 according to the status of the communication line with a liquid crystal display device, it is preferable to establish a backlight by dividing it by every region whose luminance is controlled or to use a two-dimensional array of LED emitting white light as a backlight, and to control the amount of luminance of the LED corresponding to the control region.

The invention claimed is:

1. A portable communication terminal comprising:
a wireless communication unit transmitting and receiving data by connecting to a communication line by wireless;
a broadcasting receiving unit receiving digital broadcasting including a program image and a trigger by which a user connects the portable communication terminal to the communication line;
a display unit which has an image display region on which the program image received by the broadcasting receiving unit is displayed, and a trigger display region on which the trigger received by the broadcasting receiving unit is displayed; and
a display control unit controlling luminance of the trigger display region, when the communication line is not connectable while digital broadcasting data is displayed on the display unit.

2. The portable communication terminal of claim 1, wherein the display control unit controls display of a contour of the trigger display region.

3. The portable communication terminal of claim 1, wherein the display control unit makes the luminance lower than normal, when the communication line is not connectable while the digital broadcasting data is displayed on the display unit.

4. The portable communication terminal of claim 1, wherein the display control unit displays the trigger display region in color when the communication line is connectable and in monochrome when the communication line is not connectable.

5. The portable communication terminal of claim 1, further comprising:
- a communication service area determining unit determining whether the wireless communication unit is in a communication service area;
- an access request detecting unit detecting an access request to the communication line; and
- a wireless communication control unit controlling the wireless communication unit based on a detection result by the access request detecting unit,
- wherein the wireless communication control unit checks determination result by the communication service area determining unit, selectively reserves access request when the access request detecting unit detects the access request in a condition that the wireless communication unit is not in communication service area, and selectively executes the reserved access request through the wireless communication unit in a condition the wireless communication unit becomes to be in communication service area.

6. The portable communication terminal of claim 5, wherein the display unit has a soft key display region on which a soft key corresponding to the terrestrial digital broadcasting data is displayed, and the wireless communication control unit allows the display control unit to display a pop-up screen indicating whether to be able to reserve the access request on the trigger display region, to display a soft key for selecting whether to be able to reserve the access request on the soft key display region, and to selectively reserve the access request based on operation of the soft key when the access request detecting unit detects the access request in a condition that the wireless communication unit is not in communication service area.

7. The portable communication terminal of claim 5, wherein the display unit has a soft key display region on which a soft key corresponding to the terrestrial digital broadcasting data is displayed, and the wireless communication control unit allows the display control unit to display a pop-up screen indicating whether to be able to execute the reservation on the trigger display region, to display a soft key for selecting execution of the reservation on the soft key display region, and to selectively execute the reserved access request based on operation of the soft key when there is the reserved access request in a condition that the wireless communication unit becomes to be in communication service area.

8. The portable communication terminal of claim 1, wherein the display control unit displays a pop-up screen indicating that the communication line is not connectable on the trigger display region when the communication line is not connectable.

* * * * *